United States Patent
Meiller et al.

[11] Patent Number: 5,261,724
[45] Date of Patent: Nov. 16, 1993

[54] SPRUNG SEAT

[75] Inventors: Hermann Meiller; Matthias Mayer, both of Amberg; Josef Hoerner, Regensburg, all of Fed. Rep. of Germany

[73] Assignee: Grammer AG, Amberg, Fed. Rep. of Germany

[21] Appl. No.: 976,537

[22] Filed: Nov. 16, 1992

[30] Foreign Application Priority Data

Apr. 3, 1992 [DE] Fed. Rep. of Germany ....... 4211093

[51] Int. Cl.$^5$ .............................................. A47C 1/02
[52] U.S. Cl. .............................. 297/344.15; 248/421; 248/588
[58] Field of Search ............... 248/421, 157, 423, 588, 248/406.2, 564, 565, 578; 297/345, 18; 296/65.1, 63

[56] References Cited

U.S. PATENT DOCUMENTS

| | | |
|---|---|---|
| 3,861,637 | 1/1975 | DeLongchamp ................. 297/345 |
| 4,125,242 | 11/1978 | Meiller et al. .................. 248/421 X |

FOREIGN PATENT DOCUMENTS

| | | | |
|---|---|---|---|
| 0782871 | 4/1968 | Canada .............................. 248/564 |
| 1405783 | 10/1969 | Fed. Rep. of Germany ...... 248/564 |

Primary Examiner—Ramon O. Ramairez
Attorney, Agent, or Firm—Elliot M. Olstein; Raymond J. Lillie

[57] ABSTRACT

A sprung seat having an L-shaped base arrangement includes a spring means for adjusting the springing characteristic of the seat as desired. For that purpose the seat has a two-armed pivot lever mounted pivotably about a central horizontal mounting axis on a back portion of the L-shape, in an at least approximately horizontal position. One arm of the pivot lever is connected to one end of at least one at least approximately horizontal tension spring of the spring means. The second end part of the tension spring is fixed to a fixing portion of a support lever. The fixing portion is at least approximately aligned with the mounting axis about which the armed pivot lever is pivotable. The support lever is pivotably mounted to the back portion of the L-shape and is connected by its fixing portion to a member of the scissor support assembly.

6 Claims, 2 Drawing Sheets

SPRUNG SEAT

BACKGROUND OF THE INVENTION

One form of a sprung seat which is intended more especially as a vehicle seat and which comprises a spring means whose springing characteristic can be adjusted as desired includes an L-shaped base structure comprising a bottom portion which for example can be fixed to a floor and a back portion which stands upwardly from the bottom portion. Disposed on the bottom portion is a scissor support assembly connected to the spring means, for supporting the seat squab. The term scissor support assembly means support legs which are disposed in mutually crossing relationship and which permit deflection of the seat squab by a scissor-like movement of the legs.

In seats of that kind, there is often only a relatively small amount of space available for the spring means so that the spring means used must be of a correspondingly small size. However, such a short or small spring means normally has a hard springing characteristic or rate, and that is to be considered disadvantageous in terms of springing comfort.

SUMMARY OF THE INVENTION

An object of the present invention is to provide a sprung seat which can use a short spring means while providing a soft springing characteristic.

Another object of the present invention is to provide a sprung seat which can use a spring with a relatively hard springing characteristic while overall affording a soft springing effect without necessitating major structural complications.

Still another object of the present invention is to provide a sprung seat which gives a soft springing rate but which has a limited number of simple mechanical components.

In accordance with the present invention, the foregoing and other objects are achieved by a seat such as a vehicle seat comprising a spring means whose springing characteristic can be adjusted as desired. The spring means includes at least one tension spring having first and second end portions. An at least substantially L-shaped base means comprises a bottom portion, which for example can be fixed to a floor or the like, and a back portion which in use stands upwardly from the bottom portion. A scissor support assembly is disposed on the bottom portion, to support a seat squab structure. A pivot lever is mounted on the back portion of the base means, pivotably about an at least substantially central mounting axis defining first and second lever arms of the pivot lever, one arm of the pivot lever being connected to one end portion of the at least one tension spring. A support lever is disposed in the vicinity of said one arm of the pivot lever and is operatively connected to the scissor support assembly and has a mounting portion by which the support lever is mounted pivotably to the back portion of the base means. The second end portion of the at least one tension spring is fixed in axially at least approximately aligned relationship with the mounting axis of the pivot lever, to a fixing portion of the support lever.

Preferably, the pivot lever and the at least one tension spring in that arrangement are disposed at least approximately horizontally, with the second arm of the pivot lever having an actuating handle while the support lever is at an acute angle to the pivot lever or the spring means. As will be seen in greater detail from a preferred embodiment described hereinafter, such a configuration has the advantage that, adapted to the dimensions in the transverse or widthwise direction of the seat or back portion of the L-shaped base means, it is possible to use a spring means having at least one tension spring which, as a result of its relatively short axial dimension, can provide a relatively hard springing characteristic. In the normal rest position of the pivot lever in which the pivot lever and the spring means are oriented at least approximately horizontally, the spring means is virtually not elongated when the scissor support assembly of the seat is subjected to a loading, which means that in that position of the pivot lever the springing characteristic of the seat is very soft.

If however the pivot lever is pivoted about its central mounting axis, then, upon a corresponding loading being applied to the scissor support assembly, the at least one tension spring of the spring means is elongated and that results in the springing of the seat involving a harder springing characteristic.

In accordance with another preferred feature of the invention, the support lever is mounted linearly displaceably and pivotably on the back portion of the base means of the seat. For that purpose, the support lever may have a projection which is simply inserted into an associated hole in the back portion of the base means of the seat. The back portion of the L-shaped base means of the seat also serves as the same time for linearly guiding the backrest portion of the seat which is supported on the base means by way of the scissors support assembly.

As already mentioned above, the spring means of the seat according to the invention preferably has at least one tension spring with a high spring constant, which means that the or each tension spring can be relatively compact and therefore requires only a small amount of installation space on the seat.

Preferably, the scissor support assembly comprises a central element, first and second strip elements which are disposed at respective sides of the central element and a connecting element which interconnects the strip elements and which bears against the connecting element, with the strip elements and the connecting element defining a plane crossing the plane of the central element. The fixing portion of the support lever is connected to an edge portion of the central element of the scissor support assembly, the central element having another oppositely disposed edge portion by means of which it is pivotably mounted to the bottom portion of the base means of the seat. In that arrangement, the central element of the scissor support assembly may be in the form of a flat full element or it may be in the form of a frame-like element in order to provide for a corresponding reduction in weight.

Further objects, features and advantages of the present invention will be apparent from the following description of a preferred embodiment of the present invention.

DESCRIPTION OF THE PREFERRED EMBODIMENT

Figure 1:
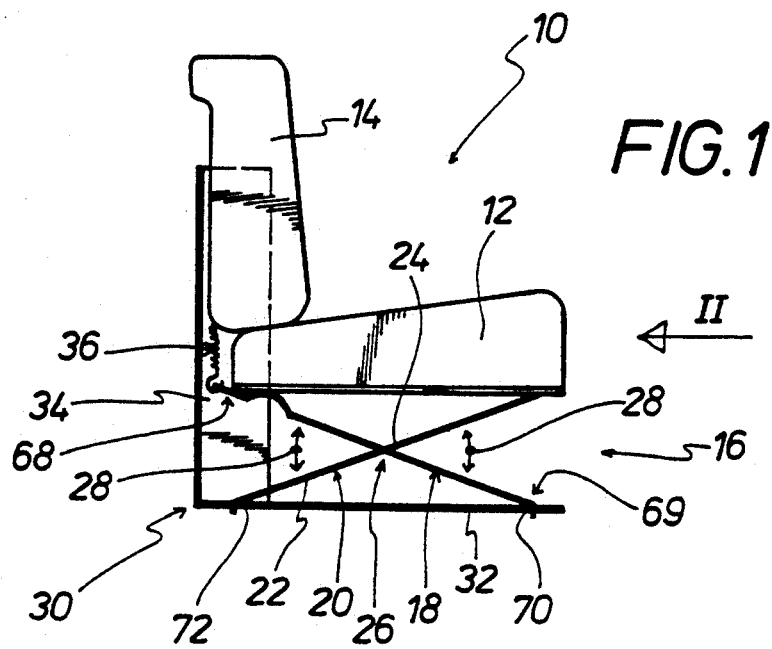
FIG. 1 is a highly diagrammatic side view of an embodiment of a seat according to the invention.

It will first be noted that, in the individual Figures of the accompanying drawings, the same components are each identified by the same reference characters, so that there is no need, when describing the individual Figures, for every feature therein to be repeatedly described in each case.

Referring firstly to FIG. 1, shown therein is a diagrammatic view of a seat which is generally indicated by reference numeral 10 and which may be in particular a vehicle seat. The seat 10 comprises a seat squab portion 12 and a backrest portion 14 which projects upwardly from the seat squab portion 12. The seat squab portion 12 is carried on a scissor support assembly generally indicated at 16, comprising two mutually crossing scissor elements as indicated at 18 and 20. The element 18 is in the form of a full or solid element, as can be clearly seen from FIGS. 2 and 3, while the element 20 comprises first and second strip elements 22 which are disposed at respective sides of the element 18 and which are interconnected by means of a transversely extending connecting element 24. It will be seen from FIG. 1 that the strip elements 22 form a plane which crosses the plane of the central element 18. Accordingly, the connecting element 24 bears on the central element 18 and thereby forms a pivot axis as diagrammatically indicated at 26 in FIG. 1, about which the scissor support assembly elements 18 and 19 are pivotable relative to each other, as indicated by the double-headed arrow 28 in FIG. 1.

The support assembly 16 is disposed on an at least substantially L-shaped base means generally indicated at 30, which comprises a bottom portion 32 which for example can be fixed to a floor such as a vehicle floor, and a back portion 34 which stands upwardly from the bottom portion 32. The bottom portion 32 serves to mount the scissor support assembly 16 and the back portion 34 serves for linearly guiding the backrest portion 14 of the seat 10 when a seat occupant is sitting on the seat 10.

Reference numeral 36 in FIG. 1 identifies a spring means which is connected to the support assembly 16 for providing springing for the seat 10. The configuration and arrangement of the spring means 36 will be described in greater detail hereinafter with reference to FIGS. 2 and 3.

Figure 2:
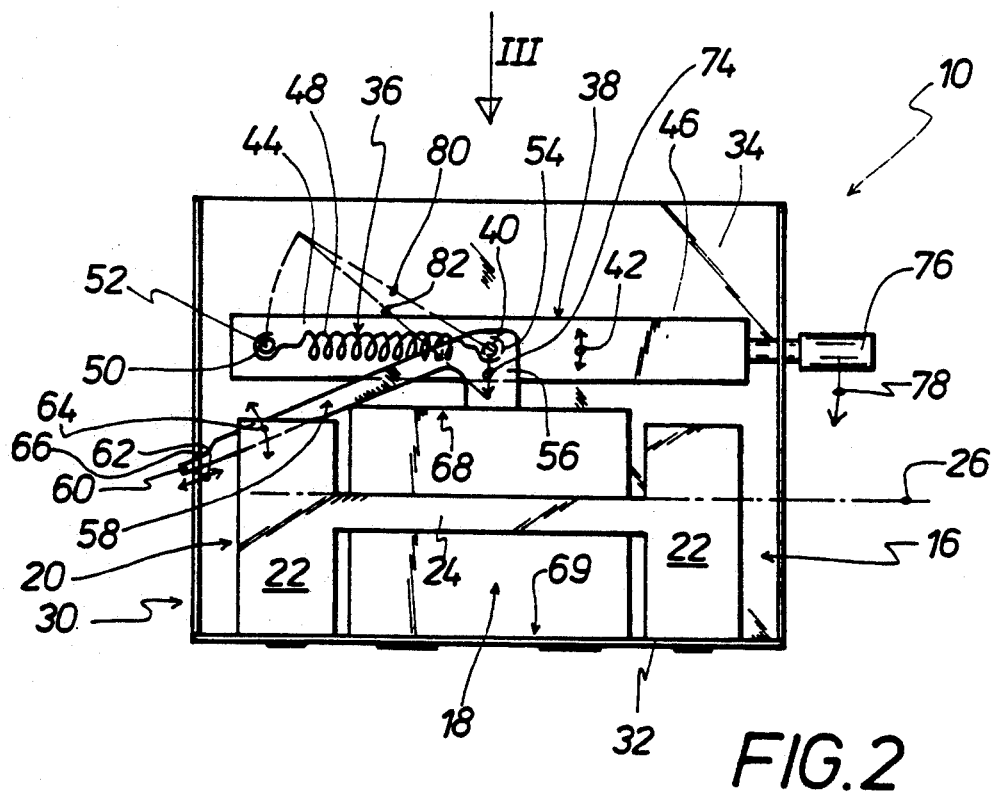
FIG. 2 is a front view of the seat shown in FIG. 1 looking in the direction indicated by the arrow II, but not showing the seat squab plate and the backrest portion of the actual seat.
Figure 3:
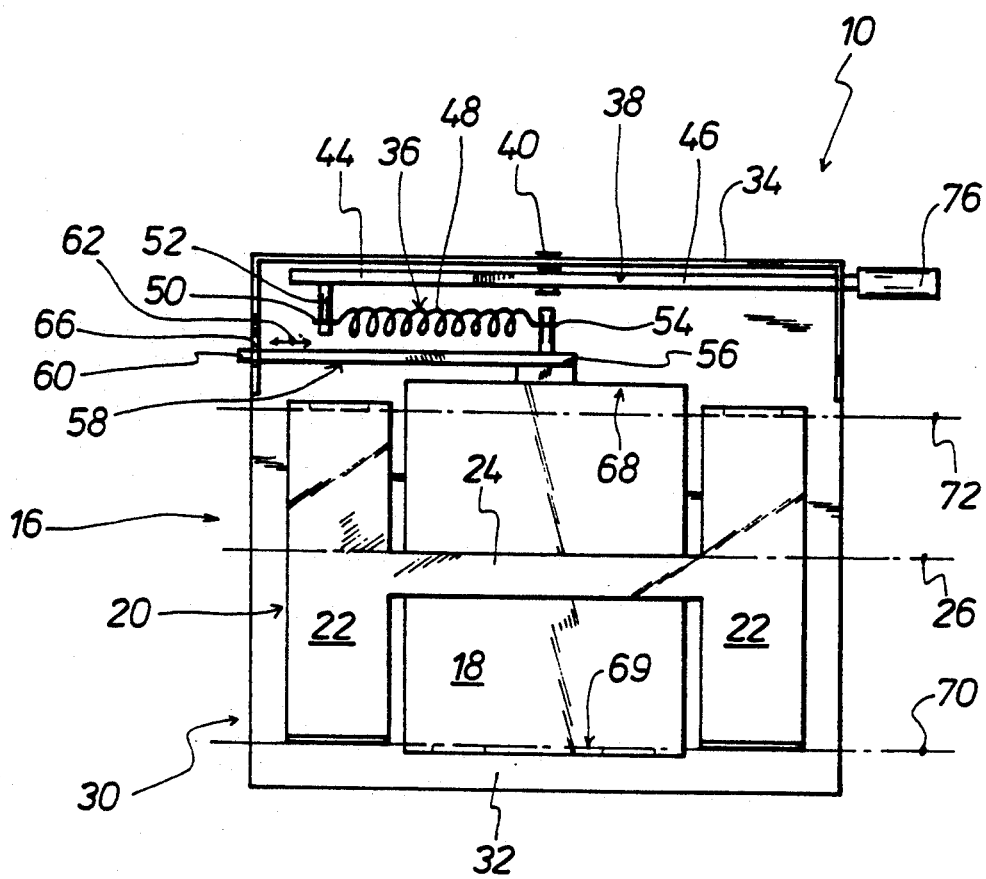
FIG. 3 is a plan view in the direction indicated by the arrow III in FIG. 2 showing the major components of the FIG. 2 seat.

Looking therefore now at FIGS. 2 and 3, shown therein is a pivot lever 38 which is mounted pivotably to the back portion 34 of the L-shaped base means 32 by means of an at least substantially central mounting axis 40, the pivotal movement of the pivot lever 38 being indicated in FIG. 2 by the arcuate double-headed arrow 42. The mounting axis 40 defines first and second arms on the pivot lever 38, being a first lever arm 44 and a second lever arm 46. The spring means 36 has at least one tension spring 48 which is connected by way of its one connecting end 50 to the end portion of the first lever arm 44, which is remote from the mounting axis 40. For that purpose, the lever arm 44 has a connecting or fixing pin 52 thereon, projecting downwardly in the view shown in FIG. 2. The second end 54 of the tension spring 48 is suitably fixed or connected to a fixing or connecting portion indicated at 56 in FIGS. 2 and 3, of a support lever 58. The support lever 58 is disposed at a spacing in front of the pivot lever 38, as can be seen from the plan view in FIG. 3.

The support lever 58 has a mounting portion 60 which is remote from the fixing or connecting portion 56 thereof and the mounting portion 60 is mounted to the back portion 34 of the L-shaped base means 30 in such a way as to be linearly movable relative thereto, as indicated by the arrow 62 shown in FIGS. 2 and 3, and also pivotally movable relative thereto, as indicated by the arrow indicated at 64 in FIG. 2. For that purpose the back portion 34 has a hole 66 into which the mounting portion 60 of the support lever 58 projects.

The fixing or connecting portion 56 of the support lever 58 is suitably fixed to an edge portion 68 of the central element 18 of the support assembly 16. The other edge portion 69 of the element 18, which is in opposite relationship to the edge portion 68, is mounted to the bottom portion 32 of the base means 30 pivotably about a mounting axis as indicated at 70 in FIGS. 1 and 3. The second element 20 of the support assembly 16 is mounted to the bottom portion 32 pivotably about a second mounting axis indicated at 72 in FIGS. 1 and 3, which is parallel to the mounting axis 70.

The structure of the seat according to the invention having been described, the mode of operation of the seat will now be set forth.

Referring to FIG. 2, the pivot lever 38 and the tension spring 48 are arranged at least approximately horizontally. If a person sits on the seat 10 when the pivot lever 38 is in that position, the support assembly 16 is correspondingly compressed in a vertical direction by the scissor arms moving towards each other, by pivotal movements as indicated by the arrows 28 in FIG. 1, and accordingly the fixing portion 56 of the support lever 58 moves downwardly in the direction indicated by the arrow 74 in FIG. 2. When that happens, the tension spring is virtually not elongated, which means that the seat has a soft springing performance when the pivot lever 38 is in the horizontal position shown in FIG. 2, even when the tension spring 48 is a hard spring. If however the pivot lever 38 is pivoted downwardly about the central mounting axis 40 in the direction indicated by the arrow 78, by means of an actuating handle 76 which projects laterally from its second lever arm 46, then the tension spring 48 moves for example into a position as indicated by the broken line 80 in FIG. 2. If a person sits on the seat 10 with the assembly in that position, then, as is readily apparent from FIG. 2, that results in a corresponding increase in the length of the tension spring 48, as indicated by the dash-dotted line 82 in FIG. 2. That increase in the length of the tension spring 48 corresponds to a harder springing characteristic in respect thereof.

In accordance with the invention therefore, the seat 10 provides that it is possible to set any desired springing characteristic quickly and without involving a great deal of force, while in addition a soft springing performance can be achieved when using a hard spring. The seat according to the invention thus provides a soft springing characteristic together with ease and rapidity of adjustability of the seat characteristic by virtue of the fact that the pivot lever 38 can be quickly adjusted at any time. The seat can also be seen to be of a simple mechanical configuration which is advantageous in terms of manufacture and assembly.

It will be appreciated that the above-described seat has been set forth only by way of example and illustration of the principles of the present invention and that various modifications and alterations may be made therein without thereby departing from the spirit and scope of the invention.

What is claimed is:

1. A seat including: an at least substantially L-shaped base means comprising a bottom portion and a back portion which stands upwardly from the bottom portion; a scissor support assembly disposed on the bottom portion; a spring means comprising at least one tension spring having first and second end portions; a pivot lever mounted on the back portion pivotably about an at least substantially central mounting axis defining first and second lever arms, one arm of the pivot lever being connected to one end portion of the tension spring; and a support lever disposed in the vicinity of said one arm of the pivot lever and operatively connected to the scissor support assembly, the support lever having a mounting portion by which the support lever is mounted pivotably to said back portion of said base means, the second end portion of the tension spring being connected in axially at least approximately aligned relationship with said mounting axis of said pivot lever to a portion of said support lever, the arrangement being such that the springing characteristic of said spring means is adapted to be adjustable.

2. A seat as set forth in claim 1 wherein said pivot lever and said tension spring are disposed at least approximately horizontally in a rest position thereof and wherein said second arm of said pivot lever carries an actuating handle means.

3. A seat as set forth in claim 1 wherein said support lever is mounted linearly displaceably and pivotably to said back portion.

4. A seat as set forth in claim 1 wherein said spring means comprises at least one tension spring with a high spring constant.

5. A seat as set forth in claim 1 wherein said scissor support assembly comprises a central element, first and second strip elements which are disposed at respective sides of said central element, and a connecting element which interconnects said strip elements and which bears on said central element, the strip elements and the connecting element defining a plane crossing the plane of the central element, and wherein said portion of said support lever to which said spring means is connected is connected to an edge portion of said central element of the support assembly, the central element having an oppositely disposed edge portion by which it is pivotably mounted to the bottom portion of the base means.

6. A seat comprising: a seat squab portion; a base means comprising a bottom portion to be fixed to a seat mounting surface and a back portion which in the position of use projects upwardly from the bottom portion; a scissor support assembly operatively disposed between said seat squab portion and said bottom portion and adapted to permit vertical movement of said seat squab portion relative to said base portion; a tension spring having first and second end portions, for providing for springing of said seat squab portion relative to said bottom portion of said base means; a pivot lever mounted to said back portion pivotably about a mounting axis therefor defining first and second lever arms, one arm of said pivot lever being connected at a spacing from said mounting axis to one end portion of said tension spring; a support lever disposed adjacent said one arm of said pivot lever and having a first end portion movably mounted to said back portion of said base means and a second end portion to which said second end portion of said tension spring is connected in axially at least approximately aligned relationship with said mounting axis; and means connecting said support lever adjacent said second end portion thereof to said scissor support assembly, the arrangement being such that pivotal movement of said pivot lever is adapted to adjust the springing characteristic of said tension spring.

* * * * *